(12) United States Patent
Matsunaga et al.

(10) Patent No.: US 9,041,866 B2
(45) Date of Patent: May 26, 2015

(54) RECEIVING APPARATUS, METHOD, AND STORAGE MEDIUM

(71) Applicant: Canon Kabushiki Kaisha, Tokyo (JP)

(72) Inventors: Seiji Matsunaga, Kawasaki (JP); Noriaki Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/326,206

(22) Filed: Jul. 8, 2014

(65) Prior Publication Data

US 2015/0015794 A1 Jan. 15, 2015

(30) Foreign Application Priority Data

Jul. 10, 2013 (JP) ................................ 2013-144755

(51) Int. Cl.
*H04N 5/63* (2006.01)
(52) U.S. Cl.
CPC ....................................... *H04N 5/63* (2013.01)
(58) Field of Classification Search
USPC ......... 348/730, 728, 731, 552–569, 705, 706; 713/320, 323, 324
See application file for complete search history.

(56) References Cited

U.S. PATENT DOCUMENTS

2006/0082690 A1\* 4/2006 Englert .......................... 348/731
2009/0063911 A1\* 3/2009 Tsukio et al. ................. 714/708

FOREIGN PATENT DOCUMENTS

JP 2013-38706 A 2/2013

\* cited by examiner

*Primary Examiner* — Michael Lee
(74) *Attorney, Agent, or Firm* — Canon USA Inc IP Division

(57) ABSTRACT

A receiving apparatus including a first communication unit that receives first image data from a transmission apparatus, a second communication unit that receives second image data from the transmission apparatus, a power supply unit that supplies power to at least one of the first communication unit and the second communication unit, and a control unit that causes a display device to display an image generated based on the first image data and the second image data, where the control unit controls the power supply unit so as to limit power supply to one of the first communication unit and the second communication unit in response to completion of the display of the image by the display device.

13 Claims, 3 Drawing Sheets

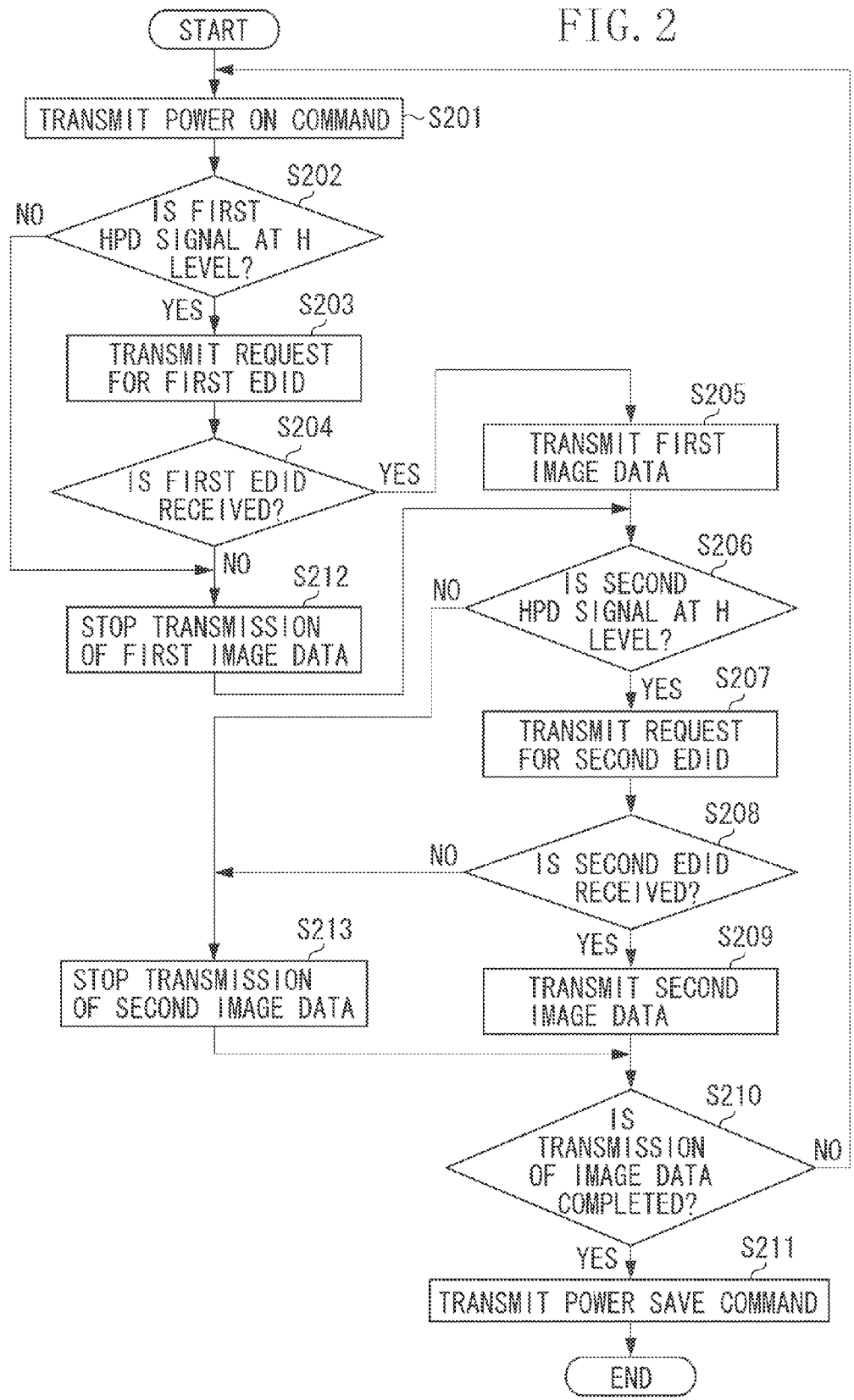

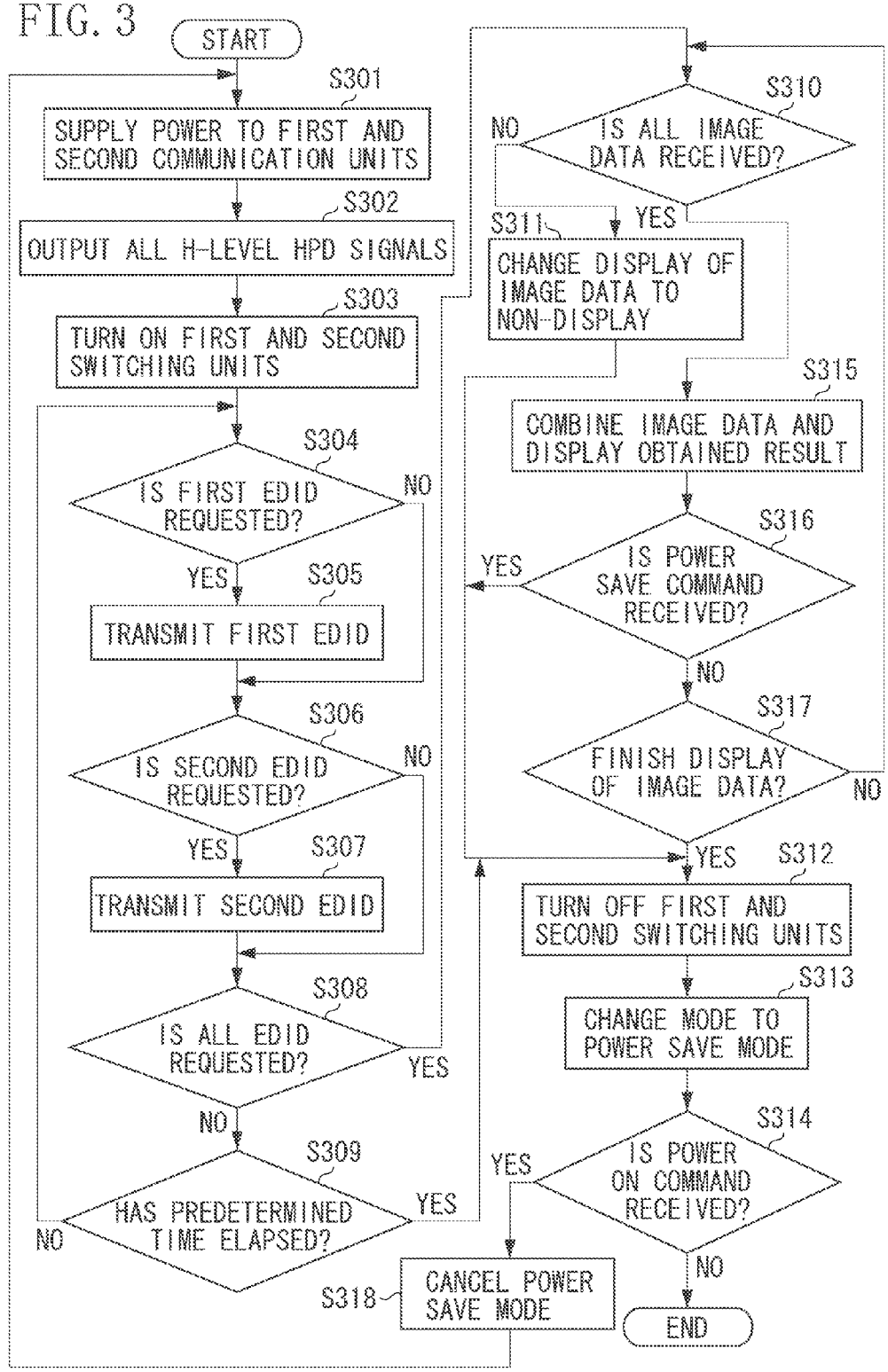

RECEIVING APPARATUS, METHOD, AND STORAGE MEDIUM

BACKGROUND

1. Field

Aspects of the present invention generally relate to a receiving apparatus configured to receive image data or audio data.

2. Description of the Related Art

Currently, receiving apparatus which can display high-resolution image data of 4K2K (3840×2160 pixels) is proposed. Japanese Patent Application Laid-Open No. 2013-38706 discusses a communication system connecting a transmission apparatus and receiving apparatus via a plurality of communication interfaces in order to transmit high-resolution image data from a transmission apparatus to a receiving apparatus.

According to the above-described communication system, the transmission apparatus divides the high-resolution image and transmits each divided piece of image to the receiving apparatus via each of the communication interfaces.

Conventionally, the communication with the transmission apparatus is continuously performed by the receiving apparatus via each of the communication interfaces even when the transmission apparatus is not transmitting image data to the receiving apparatus. Thus, in order to maintain communication with the transmission apparatus, useless power is consumed by the receiving apparatus even when the transmission apparatus is not transmitting image data to the receiving apparatus.

SUMMARY

Aspects of the present invention are generally directed to a receiving apparatus capable of reducing power consumption when a transmission apparatus is not transmitting image data to the receiving apparatus.

According to an aspect of the present invention, there is provided a receiving apparatus including a first communication unit that receives first image data from a transmission apparatus, a second communication unit that receives second image data from the transmission apparatus, a power supply unit that supplies power to at least one of the first communication unit and the second communication unit, and a control unit that causes a display device to display an image generated based on the first image data and the second image data, wherein the control unit controls the power supply unit so as to limit power supply to one of the first communication unit and the second communication unit in response to completion of display of the image by the display device.

Further features of the present disclosure will become apparent from the following description of exemplary embodiments with reference to the attached drawings.

BRIEF DESCRIPTION OF THE DRAWINGS

FIG. 2 is a flowchart illustrating an example of transmission process performed by a transmission apparatus according to the first exemplary embodiment.

FIG. 3 is a flowchart illustrating an example of reception process performed by a receiving apparatus according to the first exemplary embodiment.

DESCRIPTION OF THE EMBODIMENTS

Figure 1:
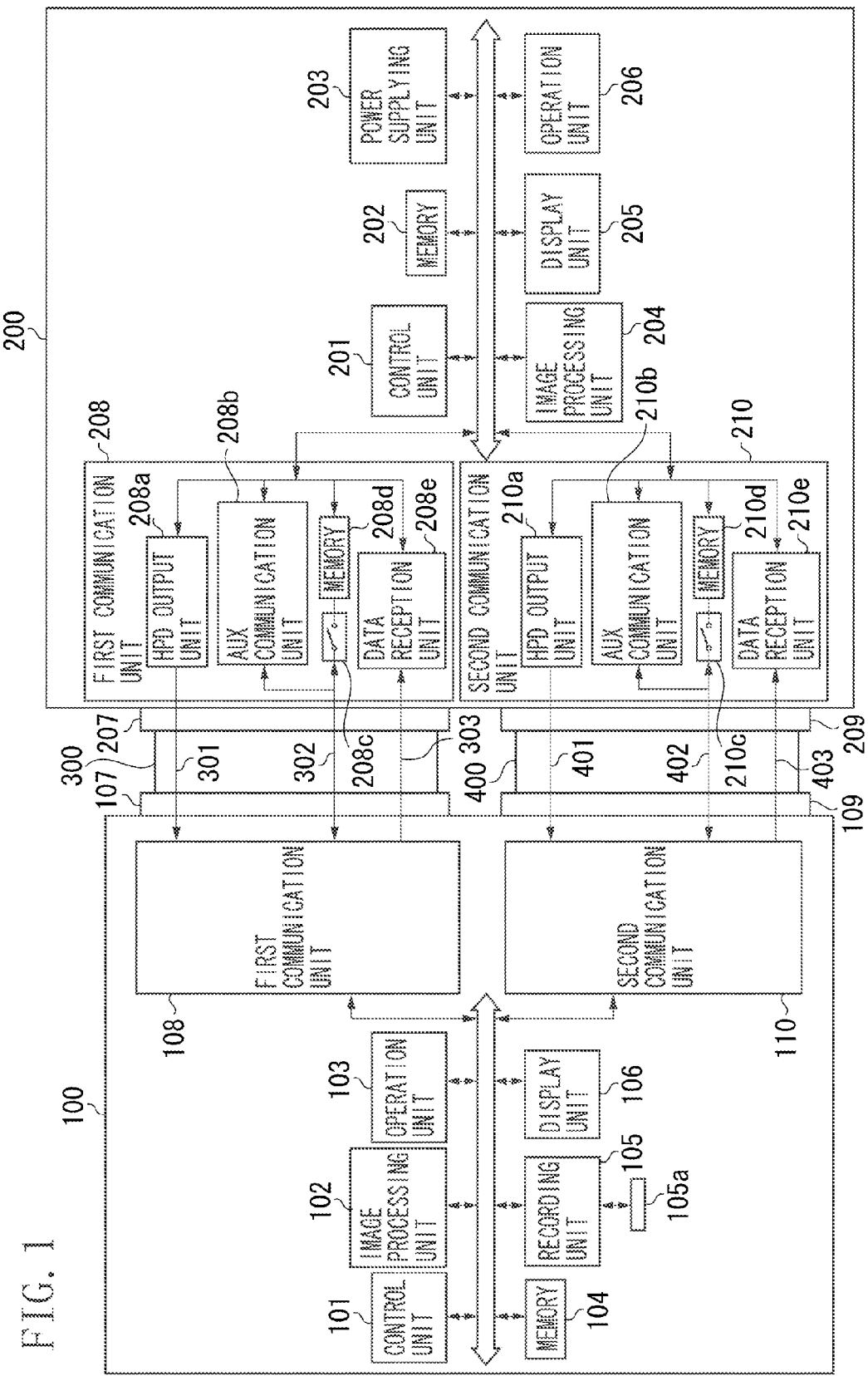
FIG. 1 is a block diagram illustrating an example of a communication system according to a first exemplary embodiment.

Various exemplary embodiments will be described in detail below with reference to the drawings.

A first exemplary embodiment will be described with reference to drawings.

FIG. 1 illustrates a communication system according to the first exemplary embodiment. The communication system includes a transmission apparatus 100, a receiving apparatus 200, and cables 300 and 400. The transmission apparatus 100 and the receiving apparatus 200 are connected via the cable 300. Further, the transmission apparatus 100 and the receiving apparatus 200 are connected via the cable 400. The cables 300 and 400 are communication interfaces that conform to DisplayPort® standard. The transmission apparatus 100 and the receiving apparatus 200 are compliant with the DisplayPort® standard. The transmission apparatus 100 is an external apparatus which transmits at least one of image data and audio data to the receiving apparatus 200. The transmission apparatus 100 is, for example, a camera, a recorder, or a player. The receiving apparatus 200 displays or outputs at least one of image data and audio data which has been transmitted from the transmission apparatus 100. The receiving apparatus 200 can be a display device such as a personal computer or a television.

Next, the cables 300 and 400 will be described. As illustrated in FIG. 1, the cable 300 includes a Hot Plug Detect (HPD) line 301, an Auxiliary (AUX) line 302, and a MAIN LINK line 303. Further, the cable 400 includes an HPD line 401, an AUX line 402, and a MAIN LINK line 403.

The HPD lines 301 and 401 transmit HPD signals from the receiving apparatus 200 to the transmission apparatus 100.

The HPD signal indicates whether the acquisition of the device information of the receiving apparatus 200 by the transmission apparatus 100 is permitted by the receiving apparatus 200.

The device information of the receiving apparatus 200 is, for example, Extended Display Identification Data (EDID). The EDID of the receiving apparatus 200 includes identification data of the receiving apparatus 200 and data indicating the display capability of the receiving apparatus 200, and data indicating the audio output capability of the receiving apparatus 200. Further, the EDID of the receiving apparatus 200 includes information of the image format or the audio format supported by the receiving apparatus 200. Further, information of the resolution and the color space of the receiving apparatus 200 is also included in the EDID of the receiving apparatus 200.

The AUX lines 302 and 402 are used for transmitting commands, in a bidirectional manner, between the transmission apparatus 100 and the receiving apparatus 200.

The MAIN LINK lines 303 and 403 are used for transmitting at least one of image data and audio data from the transmission apparatus 100 to the receiving apparatus 200.

Next, the transmission apparatus 100 will be described with reference to FIG. 1. The transmission apparatus 100 includes a control unit 101, an image processing unit 102, an operation unit 103, a memory 104, a recording unit 105, a display unit 106, a first connector 107, a first communication unit 108, a second connector 109, and a second communication unit 110.

The control unit 101 controls each unit of the transmission apparatus 100. The control unit 101 controls the transmission apparatus 100 by executing a computer-executable program recorded in the memory 104.

The image processing unit 102 performs image process of the image data supplied from the recording unit 105. The image process performed by the image processing unit 102 is, for example, conversion process of the image data supplied from the recording unit 105 into image data to be transmitted to the receiving apparatus 200. The conversion process is performed based on the EDID acquired from the receiving apparatus 200. Further, the image process performed by the image processing unit 102 can be conversion process of the image data supplied from the recording unit 105 to image data to be displayed on the display unit 106.

After the image data is subjected to the image process by the image processing unit 102, it is supplied to at least one of the recording unit 105, the display unit 106, the first communication unit 108, and the second communication unit 110.

The operation unit 103 provides a user interface used for the operation of the transmission apparatus 100. The operation unit 103 includes buttons, switches, and a touch panel used for the operation of the transmission apparatus 100.

The memory 104 stores a computer-executable program which is executed by the control unit 101. Further, the memory 104 stores data acquired from at least one of the first communication unit 108 and the second communication unit 110.

The recording unit 105 can record data in a recording medium 105a. It can also read out data from the recording medium 105a.

The recording unit 105 records at least one of the image data and the audio data in the recording medium 105a according to an instruction from the control unit 101. Further, the recording unit 105 reads out at least one of the image data and the audio data from the recording medium 105a according to an instruction from the control unit 101.

The recording medium 105a can be a medium mounted in the transmission apparatus 100 or removable from the transmission apparatus 100.

The display unit 106 displays image data supplied from at least one of the image processing unit 102 and the recording unit 105. The display unit 106 includes an external display device connected to the transmission apparatus 100.

The first connector 107 is an output connector that connects the cable 300 to the receiving apparatus 200.

If the first connector 107 is connected to the receiving apparatus 200 via the cable 300, the first communication unit 108 communicates with the receiving apparatus 200 via the cable 300.

The first communication unit 108 detects whether the HPD signal is at High (H) or Low (L) level via the HPD line 301, and notifies the control unit 101 of the detected HPD signal. The HPD signal transmitted from the receiving apparatus 200 to the transmission apparatus 100 via the HPD line 301 is hereinafter referred to as a "first HPD signal".

If the first communication unit 108 detects that the first HPD signal is at H level, the first communication unit 108 transmits a request for the acquisition of the EDID to the receiving apparatus 200 via the AUX line 302. If the first communication unit 108 detects that the first HPD signal is not at H level, the first communication unit 108 does not transmit the request for the acquisition of the EDID to the receiving apparatus 200 via the AUX line 302. If the receiving apparatus 200 receives the request for the acquisition of the EDID via the AUX line 302, the receiving apparatus 200 transmits the EDID to the transmission apparatus 100 via the AUX line 302. The EDID transmitted from the receiving apparatus 200 to the transmission apparatus 100 via the AUX line 302 is hereinafter referred to as "first EDID (first device information)".

If the first communication unit 108 acquires the first EDID from the receiving apparatus 200 via the AUX line 302, the first communication unit 108 supplies the first EDID to the control unit 101. The control unit 101 analyzes the first EDID supplied from the first communication unit 108 and stores the result of the analysis in the memory 104.

The second connector 109 is an output connector that connects the cable 400 to the receiving apparatus 200.

If the second connector 109 is connected to the receiving apparatus 200 via the cable 400, the second communication unit 110 communicates with the receiving apparatus 200 via the cable 400.

The second communication unit 110 detects whether the HPD signal is at H or L level via the HPD line 401, and notifies the control unit 101 of the detected HPD signal. The HPD signal transmitted from the receiving apparatus 200 to the transmission apparatus 100 via the HPD line 401 is hereinafter referred to as a "second HPD signal".

If the second communication unit 110 detects that the second HPD signal is at H level, the second communication unit 110 transmits a request for the acquisition of the EDID to the receiving apparatus 200 via the AUX line 402. If the second communication unit 110 detects that the second HPD signal is not at H level, the second communication unit 110 does not transmit the request for the acquisition of the EDID to the receiving apparatus 200 via the AUX line 402. If the receiving apparatus 200 receives the request for the acquisition of the EDID via the AUX line 402, the receiving apparatus 200 transmits the EDID to the transmission apparatus 100 via the AUX line 402. The EDID transmitted from the receiving apparatus 200 to the transmission apparatus 100 via the AUX line 402 is hereinafter referred to as "second EDID (second device information)".

If the second communication unit 110 acquires the second EDID from the receiving apparatus 200 via the AUX line 402, the second communication unit 110 supplies the second EDID to the control unit 101. The control unit 101 analyzes the second EDID supplied from the second communication unit 110 and stores the result of the analysis in the memory 104.

Next, the receiving apparatus 200 will be described with reference to FIG. 1. The receiving apparatus 200 includes a control unit 201, a memory 202, a power supplying unit 203, an image processing unit 204, a display unit 205, an operation unit 206, a first connector 207, a first communication unit 208, a second connector 209, and a second communication unit 210.

The control unit 201 controls each unit of the receiving apparatus 200. The control unit 201 controls the receiving apparatus 200 by executing a computer-executable program recorded in the memory 202. Further, the control unit 201 includes a timer 201a (not illustrated).

The memory 202 stores a computer-executable program which is executed by the control unit 201. Further, the memory 202 stores data acquired from at least one of the first communication unit 208 and the second communication unit 210.

The power supplying unit 203 supplies power supplied from either an AC adapter or a battery to each unit of the receiving apparatus 200 according to an instruction from the control unit 201.

The image processing unit 204 performs image process on image data supplied from at least one of the first communication unit 208 and the second communication unit 210. The image process performed by the image processing unit 204 may be, for example, conversion process for converting image data supplied from at least one of the first communication unit 208 and the second communication unit 210 into image data to be displayed on the display unit 205.

After the image data is subjected to the image process performed by the image processing unit 204, it is supplied to the display unit 205.

The display unit 205 displays image data supplied from at least one of the first communication unit 208, the second communication unit 210, and the image processing unit 204. The display unit 205 includes an external display device connected to the receiving apparatus 200.

The operation unit 206 provides a user interface used for the operation of the receiving apparatus 200. The operation unit 206 includes buttons, switches, and a touch panel used for the operation of the receiving apparatus 200.

The first connector 207 is an input connector that connects the cable 300 to the transmission apparatus 100.

If the first connector 207 is connected to the transmission apparatus 100 via the cable 300, the first communication unit 208 communicates with the transmission apparatus 100 via the cable 300.

The first communication unit 208 includes an HPD output unit 208a, an AUX communication unit 208b, a first switching unit 208c, a memory 208d, and a data reception unit 208e.

The HPD output unit 208a outputs the first HPD signal at H or L level to the transmission apparatus 100 via the HPD line 301.

The AUX communication unit 208b communicates with the transmission apparatus 100 via the AUX line 302. If the first connector 207 is connected to the transmission apparatus 100 via the cable 300, the control unit 201 connects the AUX line 302 and the memory 208d by turning on the first switching unit 208c. If the first connector 207 is connected to the transmission apparatus 100 via the cable 300, the control unit 201 disconnects the AUX line 302 and the memory 208d by turning off the first switching unit 208c.

The memory 208d, which is a first memory, stores the first EDID.

If the receiving apparatus 200 permits the acquisition of the first EDID by the transmission apparatus 100, the HPD output unit 208a outputs the first HPD signal at H level to the transmission apparatus 100 via the HPD line 301. If the receiving apparatus 200 does not permit the acquisition of the first EDID by the transmission apparatus 100, the HPD output unit 208a outputs the first HPD signal at L level to the transmission apparatus 100 via the HPD line 301.

If the first switching unit 208c is turned on, the transmission apparatus 100 can acquire the first EDID. However, if the first switching unit 208c is turned off, the transmission apparatus 100 cannot acquire the first EDID.

The data reception unit 208e receives at least one of the image data and audio data transmitted from the transmission apparatus 100 via the MAIN LINK line 303. The data reception unit 208e supplies the image data transmitted from the transmission apparatus 100 to the image processing unit 204.

The second connector 209 is an input connector that connects the cable 400 to the transmission apparatus 100.

If the second connector 209 is connected to the transmission apparatus 100 via the cable 400, the second communication unit 210 communicates with the transmission apparatus 100 via the cable 400.

The second communication unit 210 includes an HPD output unit 210a, an AUX communication unit 210b, a second switching unit 210c, a memory 210d, and a data reception unit 210e.

The HPD output unit 210a outputs the second HPD signal at H or L level to the transmission apparatus 100 via the HPD line 401.

The AUX communication unit 210b communicates with the transmission apparatus 100 via the AUX line 402. If the second connector 209 is connected to the transmission apparatus 100 via the cable 400, the control unit 201 connects the AUX line 402 and the memory 210d by turning on the second switching unit 210c. If the second connector 209 is connected to the transmission apparatus 100 via the cable 400, the control unit 201 disconnects the AUX line 402 and the memory 210d by turning off the second switching unit 210c.

The memory 210b, which is a second memory, stores the second EDID.

If the receiving apparatus 200 permits the acquisition of the second EDID by the transmission apparatus 100, the HPD output unit 210a outputs the second HPD signal at H level to the transmission apparatus 100 via the HPD line 401. If the receiving apparatus 200 does not permit the acquisition of the second EDID by the transmission apparatus 100, the HPD output unit 210a outputs the second HPD signal at L level to the transmission apparatus 100 via the HPD line 401.

If the second switching unit 210c is turned on, the transmission apparatus 100 can acquire the second EDID. However, if the second switching unit 210c is turned off, the transmission apparatus 100 cannot acquire the second EDID.

The data reception unit 210e receives at least one of the image data and audio data transmitted from the transmission apparatus 100 via the MAIN LINK line 403. The data reception unit 210e supplies the image data transmitted from the transmission apparatus 100 to the image processing unit 204.

<Transmission Process>

Next, the transmission process will be described with reference to a flowchart in FIG. 2. The transmission process illustrated in FIG. 2 is performed by the control unit 101 of the transmission apparatus 100 executing a program recorded in the memory 104. The control unit 101 can also execute the transmission process illustrated in FIG. 2 by executing a program supplied to the memory 104 or to a memory (not illustrated) of the control unit 101 via a server or an operating system (OS). The transmission process illustrated in FIG. 2 is performed by the control unit 101 when the power supply of the transmission apparatus 100 is turned on and the transmission apparatus 100 is in an operation mode called division transmission mode. When the transmission apparatus 100 is in the division transmission mode, the image data to be transmitted to the receiving apparatus 200 is divided into a plurality of pieces of image. Each of the divided pieces of image is transmitted to the receiving apparatus 200 by the first communication unit 108 and the second communication unit 110. The division transmission mode is an operation mode used for the transmission of high-resolution image data such as 4K2K (3840×2160 pixels) to the receiving apparatus 200.

The control unit 101 performs the process in step S201 when power is supplied from a power supply (not illustrated) to the first communication unit 108 and the second communication unit 110.

In step S201, the control unit 101 controls the first communication unit 108 or the second communication unit 110 so that a power ON command for turning on the power supply of the receiving apparatus 200 is transmitted to the receiving apparatus 200.

In step S202, the control unit 101 detects whether the first HPD signal is at H level. If the first HPD signal is at H level (YES in step S202), the process proceeds to step S203. If the first HPD signal is not at H level (NO in step S202), the process proceeds to step S212.

In step S203, the control unit 101 controls the first communication unit 108 so that a request for the acquisition of the first EDID is transmitted to the receiving apparatus 200. Then, the process proceeds to step S204.

In step S204, the control unit 101 determines whether the first communication unit 108 has received the first EDID requested to the receiving apparatus 200 in step S203. If the first communication unit 108 has received the first EDID (YES in step S204), the process proceeds to step S205. If the first communication unit 108 has not yet received the first EDID (NO in step S204), the process proceeds to step S212.

In step S205, the control unit 101 transmits first image data to the receiving apparatus 200.

For example, the control unit 101 controls the image processing unit 102 to generate the first image data, which is image data to be transmitted to the receiving apparatus 200, based on the image data supplied from the recording unit 105 and the first EDID received by the first communication unit 108. Then, the control unit 101 controls the first communication unit 108 so that the first image data, which has been generated by the image processing unit 102, is transmitted to the receiving apparatus 200. After the first image data is transmitted to the receiving apparatus 200 by the first communication unit 108, the process proceeds to step S206.

In step S206, the control unit 101 detects whether the second HPD signal is at H level. If the second HPD signal is at H level (YES in step S206), the process proceeds to step S207. If the second HPD signal is not at H level (NO in step S206), the process proceeds to step S213.

In step S207, the control unit 101 controls the second communication unit 110 so that a request for the acquisition of the second EDID is transmitted to the receiving apparatus 200. Then, the process proceeds to step S208.

In step S208, the control unit 101 determines whether the second communication unit 110 has received the second EDID requested to the receiving apparatus 200 in step S207. If the second communication unit 110 has received the second EDID (YES in step S208), the process proceeds to step S209. If the second communication unit 110 has not yet received the second EDID (NO in step S208), the process proceeds to step S213.

In step S209, the control unit 101 transmits second image data to the receiving apparatus 200.

For example, the control unit 101 controls the image processing unit 102 to generate the second image data, which is image data to be transmitted to the receiving apparatus 200, based on the image data supplied from the recording unit 105 and the second EDID received by the second communication unit 110. Then, the control unit 101 controls the second communication unit 110 so that the second image data, which has been generated by the image processing unit 102, is transmitted to the receiving apparatus 200. After the second image data is transmitted to the receiving apparatus 200 by the second communication unit 110, the process proceeds to step S210.

In step S210, the control unit 101 determines whether the transmission of the image data to the receiving apparatus 200 is finished. If the transmission of the image data to the receiving apparatus 200 is finished (YES in step S210), the process proceeds to step S211. If the transmission of the image data to the receiving apparatus 200 is not yet finished (NO in step S210), the process returns to step S201.

In step S211, the control unit 101 controls the first communication unit 108 or the second communication unit 110 to transmit the power save command, which is used for changing the mode of the receiving apparatus 200 to the power save mode, to the receiving apparatus 200. Then, the process of the flowchart ends.

The power ON command and the power save command are commands used for controlling the power supplying unit 203.

In step S212, the control unit 101 controls the first communication unit 108 to stop the transmission of the first image data. Then the process proceeds to step S206.

In step S213, the control unit 101 controls the second communication unit 110 to stop the transmission of the second image data. Then the process proceeds to step S210.

<Reception Processing>

Next, the reception process will be described with reference to a flowchart in FIG. 3. The reception process illustrated in FIG. 3 is performed by the control unit 201 of the receiving apparatus 200 executing a program recorded in the memory 202. The control unit 201 can also execute the reception process illustrated in FIG. 3 by executing a program supplied to the memory 202 or to a memory (not illustrated) of the control unit 201 via a server or an OS. The reception process illustrated in FIG. 3 is performed by the control unit 201 when the power supply of the receiving apparatus 200 is turned on and the receiving apparatus 200 is in an operation mode called composite display mode. When the power supply of the receiving apparatus 200 is turned on, the power supplying unit 203 supplies power to the entire receiving apparatus 200. Further, when the receiving apparatus 200 is in the composite display mode, the image data received by the first communication unit 208 and the image data received by the second communication unit 210 is combined. Then, the obtained image data is displayed on the display unit 205. The composite display mode is an operation mode used for the display of high-resolution image data such as 4K2K (3840×2160 pixels).

In step S301, the control unit 201 controls the power supplying unit 203 so that power can be supplied to the first communication unit 208 and the second communication unit 210. Then, the process proceeds to step S302.

In the transmission apparatus 100, each of the first communication unit 108 and the second communication unit 110 starts the transmission process of the image data to the receiving apparatus 200 after the acquisition of the EDID. However, the first communication unit 108 does not always acquire the first EDID at same timing as the timing the second communication unit 110 acquires the second EDID. Thus, there may be a time lag between the timing the first communication unit 108 transmits the image data to the receiving apparatus 200 and the timing the second communication unit 110 transmits the image data to the receiving apparatus 200. In such a case, the receiving apparatus 200 is unable to display the image data on the display unit 205 until the first image data is received by the first communication unit 208 and the second image data is received by the second communication unit 210, which is problematic.

In order to solve such a problem, the receiving apparatus 200 performs the processing of steps S302 and S303 so that the first communication unit 108 acquires the first EDID and the second communication unit 110 acquires the second EDID at the same timing.

In step S302, the control unit 201 controls the first communication unit 208 and the second communication unit 210 so that each of them outputs an HPD signal at H level. For example, the control unit 201 instructs the HPD output unit 208a to output a first HPD signal at H level and also instructs the HPD output unit 210a to output a second HPD signal at H level. If the first communication unit 208 or the second communication unit 210 already has output an HPD signal at H level, the control unit 201 controls the communication unit that has output the HPD signal at H level to output an HPD signal at L level. Thereafter, the process proceeds to step S302, and the processing in step S302 is performed. The control unit 201 also controls the timer 201a to measure the time that elapsed from the time the HPD signal at H level has been output from each of the communication units. Then the process proceeds to step S303.

In step S303, the control unit 201 controls all the communication units so that each of the switching units is turned on. For example, the control unit 201 controls the first communication unit 208 and the second communication unit 210 so that the first switching unit 208c and the second switching unit 210c are turned on. If the first switching unit 208c or the second switching unit 210c has been already turned on, the control unit 201 turns off the switching unit which has been turned on before the process proceeds to step S303. Then the process proceeds to step S303. After the process in step S303 is finished, the process proceeds to step S304.

In step S304, the control unit 201 determines whether the AUX communication unit 208b has received the request for the acquisition of the first EDID. If the AUX communication unit 208b has received the request for the acquisition of the first EDID (YES in step S304), the process proceeds to step S305. If the AUX communication unit 208b has not yet received the request for the acquisition of the first EDID (NO in step S304), the process proceeds to step S306.

In step S305, the control unit 201 controls the AUX communication unit 208b to transmit the first EDID to the transmission apparatus 100.

In step S306, the control unit 201 determines whether the AUX communication unit 210b has received the request for the acquisition of the second EDID. If the AUX communication unit 210b has received the request for the acquisition of the second EDID (YES in step S306), the process proceeds to step S307. If the AUX communication unit 210b has not yet received the request for the acquisition of the second EDID (NO in step S306), the process proceeds to step S308.

In step S307, the control unit 201 controls the AUX communication unit 210b to transmit the second EDID to the transmission apparatus 100. Then, the process proceeds to step S308.

In step S308, the control unit 201 determines whether all EDID have been requested by the transmission apparatus 100. For example, if the first and the second EDID have been requested by the transmission apparatus 100, the control unit 201 determines that all EDID have been requested by the transmission apparatus 100. If the first EDID and the second EDID has been requested (YES in step S308), the process proceeds to step S310. If at least one of the first EDID and the second EDID has not yet been requested (NO in step S308), the process proceeds to step S309.

In step S309, the control unit 201 determines whether a predetermined time has elapsed from the time an HPD signal at H level has been output from each of the first communication unit 208 and the second communication unit 210. For example, the control unit 201 determines whether the time measured by the timer 201a is equal to or greater than a predetermined time. If the time measured by the timer 201a is equal to or greater than the predetermined time, the control unit 201 determines that the predetermined time has elapsed from the time the HPD signal at H level has been output from each of the communication units (YES in step S309), and the process proceeds to step S312. If the time measured by the timer 201a is less than the predetermined time, the control unit 201 determines that the predetermined time has not yet elapsed from the time the HPD signal at H level has been output from each of the communication units (NO in step S309), and the process returns to step S304.

In step S310, the control unit 201 determines whether all the communication units have received the image data from the transmission apparatus 100. For example, the control unit 201 determines whether the data reception unit 208e has received the first image data, and the data reception unit 210e has received the second image data.

If the first image data is received by the data reception unit 208e and, further, the second image data is received by the data reception unit 210e, the control unit 201 determines that all the communication units have received the image data from the transmission apparatus 100 (YES in step S310), and the process proceeds to step S315. If the first image data is not received by the data reception unit 208e and the second image data is received by the data reception unit 210e, the control unit 201 determines that all communication units have not received the image data from the transmission apparatus 100. Further, if the first image data is received by the data reception unit 208e and the second image data is not received by the data reception unit 210e, the control unit 201 determines that all communication units have not received the image data from the transmission apparatus 100. If the first image data is not received by the data reception unit 208e and the second image data is not received by the data reception unit 210e, the control unit 201 determines that all communication units have not received the image data from the transmission apparatus 100. In such cases (NO in step S310), the process proceeds to step S311.

In step S311, the control unit 201 controls the display unit 205 so as not to display the image data.

In step S312, the control unit 201 controls all the communication units so that each of the switching units is turned off. For example, the control unit 201 controls the first communication unit 208 and the second communication unit 210 so that the first switching unit 208c and the second switching unit 210c are turned off. Then, the process proceeds to step S313.

In step S313, the control unit 201 sets the receiving apparatus 200 to the power save mode. When the receiving apparatus 200 is in the power save mode, power is not supplied to the communication units of the receiving apparatus 200 excluding one communication unit. Further, if the receiving apparatus 200 is in the power save mode, the control unit 201 may limit the power supply from the power supplying unit 203 to the display unit 205.

For example, in step S313, the control unit 201 writes 2h to SET_POWER_STATE of a DisplayPort® Configuration Data (DPCD) register of the memory 208d. Then, the control unit 201 controls the power supplying unit 203 so that power is not supplied to the units in the first communication unit 208 other than the AUX communication unit 208b, and also controls the power supplying unit 203 so that power is not supplied to the entire second communication unit 210. Additionally, in such a case, the control unit 201 may control the power supplying unit 203 so that power is continuously supplied to the AUX communication unit 208b and the HPD output unit 208a, and may further control the power supplying unit 203 so that power is not supplied to the data reception unit 208e. In this manner, the control unit 201 sets the receiving apparatus 200 to the power save mode. Even if the receiving apparatus 200 is in the power save mode, the receiving apparatus 200 can communicate with the transmission apparatus 100 by the AUX communication unit 208b via the AUX line 302. Thus, the control unit 201 can turn on the power supply of the receiving apparatus 200 if the transmission apparatus 100 transmits a power ON command to the receiving apparatus 200 via the AUX line 302.

For other example, in step S313, the control unit 201 writes 2h to SET_POWER_STATE of a DisplayPort® Configuration Data (DPCD) register of the memory 210d. Then, the control unit 201 may control the power supplying unit 203 so that power is not supplied to the units in the second communication unit 210 other than the AUX communication unit 210b, and may also control the power supplying unit 203 so that power is not supplied to the entire first communication unit 208. Additionally, in such a case, the control unit 201 may control the power supplying unit 203 so that power is continuously supplied to the AUX communication unit 210b and the HPD output unit 210a, and may further control the power supplying unit 203 so that power is not supplied to the data reception unit 210e. In this manner, the control unit 201 can set the receiving apparatus 200 to the power save mode. Even if the receiving apparatus 200 is in the power save mode, the receiving apparatus 200 can communicate with the transmission apparatus 100 by the AUX communication unit 210b via the AUX line 402. Thus, the control unit 201 can turn on the power supply of the receiving apparatus 200 if the transmission apparatus 100 transmits a power ON command to the receiving apparatus 200 via the AUX line 402.

The process in step S313 is not limited to the above-described process so long as the state of the receiving apparatus 200 can be changed into a state where communication via the AUX line 302 or 402 is possible by the first communication unit 208 or the second communication unit 210. After step S313, the process proceeds to step S314.

In step S314, the control unit 201 determines whether the AUX communication unit 208b or the AUX communication unit 210b has received the power ON command. If the AUX communication unit 208b or the AUX communication unit 210b has received the power ON command (YES in step S314), the process proceeds to step S318. If the AUX communication unit 208b and the AUX communication unit 210b have not yet received the power ON command (NO in step S314), the process of the flowchart ends.

In step S315, the control unit 201 combines the image data sent from the transmission apparatus 100 and received by each communication unit and displays it on the display unit 205. For example, the control unit 201 controls the image processing unit 204 so that the first image data received by the data reception unit 208e is combined with the second image data received by the data reception unit 210e. Then, the control unit 201 causes the display unit 205 to display the image data, which has been combined by the image processing unit 204. After the image data generated by the image processing unit 204 is displayed on the display unit 205, the process proceeds to step S316.

In step S316, the control unit 201 determines whether the AUX communication unit 208b or the AUX communication unit 210b has received the power save command. If the AUX communication unit 208b or the AUX communication unit 210b has received the power save command (YES in step S316), the process proceeds to step S312. If none of the AUX communication unit 208b and the AUX communication unit 210b have received the power save command (NO in step S316), the process proceeds to step S317.

In step S317, the control unit 201 determines whether to finish the display of the image data transmitted from the transmission apparatus 100. For example, the control unit 201 determines whether to finish the display of the image data transmitted from the transmission apparatus 100 according to whether an operation for displaying image data other than the image data transmitted from the transmission apparatus 100 is performed with respect to the operation unit 206. If an operation for displaying image data other than the image data transmitted from the transmission apparatus 100 is performed with respect to the operation unit 206, and the control unit 201 determines that the display of the image data transmitted from the transmission apparatus 100 is to be finished (YES in step S317), then, the process proceeds to step S312. If the control unit 201 determines that the display of the image data transmitted from the transmission apparatus 100 is to be continued (NO in step S317), the process returns to step S310.

In step S318, the control unit 201 cancels the power save mode of the receiving apparatus 200.

In other words, if 2h is written to SET_POWER_STATE of the DPCD register in the memory 208d, the control unit 201 writes 0h to SET_POWER_STATE of the DPCD register in the memory 208d in step S318. If 2h is written to SET_POWER_STATE of the DPCD register in the memory 210d, the control unit 201 writes 0h to SET_POWER_STATE of the DPCD register in the memory 210d in step S318. Then, the process returns to step S301. According to the process in step S301, the power supply from the power supplying unit 203 to the first communication unit 208 and the second communication unit 210 is restarted.

In this manner, when the display of the image data which has been generated according to the image data received by each of the data reception unit 208e and the data reception unit 210e of the receiving apparatus 200 according to the first exemplary embodiment is finished (YES in step S317), the receiving apparatus 200 is set to the power save mode.

Further, if at least one of the data reception unit 208e and the data reception unit 210e does not receive the image data (NO in step S310), the receiving apparatus 200 is also set to the power save mode.

Furthermore, if at least one of the first communication unit 108 and the second communication unit 110 does not send out a request for the device information of the receiving apparatus 200 (YES in step S309), the receiving apparatus 200 is set to the power save mode.

In this manner, the power consumption of the receiving apparatus 200 can be reduced.

Additionally, even if the receiving apparatus 200 is set to the power save mode, because the receiving apparatus 200 can communicate with the transmission apparatus 100 using commands, the power save mode of the receiving apparatus 200 can be cancelled according to a command transmitted from the transmission apparatus 100.

After the power save mode is cancelled, the receiving apparatus 200 performs the above-described process so that the transmission apparatus 100 can acquire the first EDID and the second EDID at the same timing. Accordingly, the receiving apparatus 200 can prevent the time lag between the timing the first communication unit 108 transmits the image data to the receiving apparatus 200 and the timing the second communication unit 110 transmits the image data to the receiving apparatus 200. Thus, the occurrence of non-display state of the image data on the display unit 205 of the receiving apparatus 200 until the image data, which has been transmitted from the transmission apparatus 100, is received by the first communication unit 208 and the second communication unit 210 can be prevented.

By the control unit 201 performing the process in steps S302 and S303, the first communication unit 108 acquires the first EDID and the second communication unit 110 acquires the second EDID at the same timing. However, the method for controlling the timing is not limited to such an example. For example, the first communication unit 108 can acquire the first EDID and the second communication unit 110 can acquire the second EDID at the same timing by the control unit 201 performing the processing in either step S302 or S303.

In step S313, the control unit 201 sets the receiving apparatus 200 to the power save mode by writing 2h to SET_POWER_STATE of the DPCD register in either the memory 208d or the memory 210d. However, the method for setting the receiving apparatus 200 to the power save mode is not limited to such an example.

For example, the control unit 201 may alternately write 2h to SET_POWER_STATE of the DPCD register in the memory 208d and to SET_POWER_STATE of the DPCD register in the memory 210d.

Although the cables 300 and 400 are communication interfaces that conform to the DisplayPort® standard, they are not limited to above standard. Further, although the transmission apparatus 100 and the receiving apparatus 200 use the DisplayPort® interface, the interface used by the apparatuses is not limited to such an example. For example, the cables 300 and 400 may be communication interfaces that conform to High-Definition Multimedia Interface (HDMI)® standard in place of the DisplayPort® standard. Further, the cables 300 and 400 may be communication interfaces that conform to Mobile High-definition Link (MHL) standard in place of the DisplayPort® standard. Furthermore, the transmission apparatus 100 and the receiving apparatus 200 may be apparatuses compliant with the HDMI® standard or the MHL standard in place of the DisplayPort® standard.

Further, according to the first exemplary embodiment, the transmission apparatus 100 is connected to the receiving apparatus 200 by the cables 300 and 400. However, the cables 300 and 400 are not limited to the above described cables. For example, the transmission process in FIG. 2 and the reception process in FIG. 3 may be performed by a communication system including the transmission apparatus 100 and the receiving apparatus 200 which are connected by three or more cables. Thus, the transmission apparatus 100 can include three or more communication units having the configuration similar to that of the first communication unit 108, and the receiving apparatus 200 can include three or more communication units having the configuration similar to that of the first communication unit 208.

OTHER EMBODIMENTS

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2013-144755 filed Jul. 10, 2013, which is hereby incorporated by reference herein in its entirety.

What is claimed is:

1. A receiving apparatus comprising:
    a first communication unit that receives first image data from a transmission apparatus;
    a second communication unit that receives second image data from the transmission apparatus;
    a power supply unit that supplies power to at least one of the first communication unit and the second communication unit; and
    a control unit that (a) causes a display device to display an image generated based on the first image data and the second image data, (b) controls the power supply unit so as to limit power supply to one of the first communication unit and the second communication unit after display of the image by the display device is ended, and (c) controls the power supply unit to start power supply to the first communication unit in response to a reception of a command from the transmission apparatus by the second unit after power supply to the first communication is limited.

2. The receiving apparatus according to claim 1, wherein the control unit, in response to at least one of the first communication unit and the second communication unit not receiving image data from the transmission apparatus, controls the power supply unit so as to limit power supply to one of the first communication unit and the second communication unit.

3. The receiving apparatus according to claim 1, wherein the control unit, in response to the display device displaying a predetermined image, controls the power supply unit so as to limit power supply to one of the first communication unit and the second communication unit, and the predetermined image is different from the image.

4. The receiving apparatus according to claim 1, wherein the control unit controls the power supply unit, while maintaining a state where the second communication unit can communicate with the transmission apparatus, so as to limit power supply to the first communication unit.

5. The receiving apparatus according to claim 1,
    wherein the first communication unit supplies first device information relating to the receiving apparatus to the transmission apparatus,
    wherein the second communication unit supplies second device information relating to the receiving apparatus to the transmission apparatus, and
    wherein, after power supply to the first communication unit is limited, the control unit permits the transmission apparatus to acquire the first device information and the second device information in response to a reception of a command from the transmission apparatus by the second communication unit.

6. A method comprising:
    supplying power to at least one of a first communication unit that receives first image data from a transmission apparatus and a second communication unit that receives second image data from the transmission apparatus;
    causing a display device to display an image generated based on the first image data and the second image data;
    limiting power supply to one of the first communication unit and the second communication unit after of display of the image by the display device is ended; and
    starting power supply to the first communication unit in response to a reception of a command from the transmission apparatus by the second communication unit after power supply to the first communication unit is limited.

7. A non-transitory storage medium storing a program performed by a computer, wherein the program causes the computer to perform a method, the method comprising:
- supplying power to at least one of a first communication unit that receives first image data from a transmission apparatus and a second communication unit that receives second image data from the transmission apparatus;
- causing a display device to display an image generated based on the first image data and the second image data;
- limiting power supply to one of the first communication unit and the second communication unit after display of the image by the display device is ended; and
- starting power supply to the first communication unit in response to a reception of a command from the transmission apparatus by the second communication unit after power supply to the first communication is limited.

8. A receiving apparatus, comprising:
- a plurality of communication units that receive image data from a transmission apparatus;
- a power supply that supplies power to at least one of the plurality of communication units; and
- a control unit that (a) causes a display device to display an image generated based on a plurality of image data received by the plurality of communication units, (b) controls the power supply unit, while maintaining power supply to one of the plurality of communication units, so as to limit power supply to other communication units after display of the image by the display device is ended, and (c) controls the power supply unit to start power supply to other communication units, in response to a reception of a command from the transmission apparatus by one communication unit that is supplied power from the power supply unit, after power supply to other communication units is limited.

9. The receiving apparatus according to claim 8, wherein the control unit controls the power supply unit, while maintaining power supply to one of the plurality of communication units, so as to limit power supply to other communication units, in response to at least one of the plurality of communication units not receiving image data from the transmission apparatus.

10. The receiving apparatus according to claim 8, wherein the control unit controls the power supply unit, while maintaining power supply to one of the plurality of communication units, so as to limit power supply to other communication units, in response to the display device displaying a image, and the predetermined image is different from the image.

11. The receiving apparatus according to claim 8, wherein the plurality of communication units supplies each of a plurality of device information relating to the receiving apparatus to the transmission apparatus, and after power supply to other communication units is limited, the control unit permits acquisition of the plurality of device information by the transmission apparatus in response to a reception of a command from the transmission apparatus by one communication unit that is supplied power from the power supply unit.

12. A method comprising:
- supplying power to at least one of a plurality of communication units that receives image data from a transmission apparatus;
- causing a display device to display an image generated based on a plurality of image data received by the plurality of communication units;
- limiting, while maintaining power supply to one of the plurality of communication units, power supply to other communication units after display of the image by the display device is ended; and
- starting power supply to other communication units, in response to a reception of a command from the transmission apparatus by the one communication unit that is supplied power, after power supply to other communication units is limited.

13. A non-transitory storage medium storing a program performed by a computer, wherein the program cause the computer to perform a method, the method comprising:
- supplying power to at least one of a plurality of communication units that receives image data from a transmission apparatus;
- causing a display device to display an image generated based on the plurality of image data received by a plurality of communication units;
- limiting, while maintaining power supply to one of the plurality of communication units, power supply to power supply to other communication units the image by the display device is ended; and
- starting power supply to other communication units, in response to a reception of a command from the transmission apparatus by one communication unit that is supplied power, after power supply to other communication units is limited.

* * * * *